(12) United States Patent
Goodzeit et al.

(10) Patent No.: US 8,123,173 B1
(45) Date of Patent: *Feb. 28, 2012

(54) ATTITUDE AND ANTENNA STEERING SYSTEM AND METHOD FOR SPACECRAFT

(75) Inventors: Neil E. Goodzeit, Princeton, NJ (US); David Brown, Upper Makefield, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 955 days.

This patent is subject to a terminal disclaimer.

(21) Appl. No.: 12/028,728

(22) Filed: Feb. 8, 2008

Related U.S. Application Data

(62) Division of application No. 11/066,383, filed on Feb. 28, 2005, now Pat. No. 7,357,356.

(51) Int. Cl.
*B64G 1/24* (2006.01)

(52) U.S. Cl. ........... 244/164; 342/355; 342/368; 701/13

(58) Field of Classification Search ............... 244/164, 244/165, 166, 167, 168, 169, 170, 171, 171.1, 244/171.2, 158.4, 158.6; 342/369, 370, 371, 342/372, 373, 374, 375, 376, 378, 377, 352, 342/354, 355, 359; 701/13
See application file for complete search history.

(56) References Cited

U.S. PATENT DOCUMENTS

| | | | |
|---|---|---|---|
| 5,117,901 A | 6/1992 | Cullimore | |
| 5,791,598 A | 8/1998 | Rodden et al. | |
| 5,794,891 A | 8/1998 | Polle et al. | |
| 6,293,502 B1 | 9/2001 | Fowell | |
| 6,311,932 B1 | 11/2001 | Rodden et al. | |
| 6,616,104 B1 | 9/2003 | Cheng et al. | |
| 6,695,263 B1 | 2/2004 | Goodzeit | |
| 7,143,982 B2 | 12/2006 | Ebert et al. | |
| 2003/0034422 A1 | 2/2003 | Higgins | |
| 2005/0103941 A1 | 5/2005 | Ebert et al. | |
| 2006/0118677 A1 | 6/2006 | Goodzeit | |

FOREIGN PATENT DOCUMENTS

WO PCT/US04/33736 10/2004

OTHER PUBLICATIONS

"Phased array." Wikipedia, The Free Encyclopedia. Jan. 19, 2007, 16:17 UTC. Wikimedia Foundation, Inc. Jan. 22, 2007 <http://en.wikipedia.org/w/index.php?title=Phased_array&oldid=101805431>.

"Galileo Systrem Test Bed Version 1 experimentation is now complete" webpage from www.esa.int dated Jan. 7, 2005. (2 pages).

*Primary Examiner* — Benjamin P Lee
(74) *Attorney, Agent, or Firm* — McDermott Will & Emery LLP

(57) ABSTRACT

A method of providing attitude and antenna steering for a spacecraft having a number of reaction wheels and a number of antennas is disclosed. The method includes determining a beta angle, the beta angle being the angle between a sun vector and an orbit plane of the spacecraft, and engaging either a first mode or a second mode in an alternate manner to provide attitude and antenna steering based on the beta angle. A target frame generator for generating information usable to provide attitude and antenna steering for a spacecraft is also disclosed.

9 Claims, 4 Drawing Sheets

ATTITUDE AND ANTENNA STEERING SYSTEM AND METHOD FOR SPACECRAFT

CROSS-REFERENCES TO RELATED APPLICATION(S)

The present application is a divisional application of U.S. patent application Ser. No. 11/066,383 entitled "ATTITUDE AND ANTENNA STEERING SYSTEM FOR GEOSYNCHRONOUS EARTH ORBIT (GEO) SPACECRAFT," filed on Feb. 28, 2005, now issued as U.S. Pat. No. 7,357,356, the disclosure of which is hereby incorporated by reference in its entirety for all purposes.

STATEMENT AS TO RIGHTS TO INVENTIONS MADE UNDER FEDERALLY SPONSORED RESEARCH OR DEVELOPMENT

Not Applicable.

BACKGROUND

The present invention generally relates to spacecraft control, and more specifically, to methods and systems for providing attitude and antenna steering control for spacecraft.

In geosynchronous orbit, the attitude of a spacecraft is typically controlled so that the yaw/roll plane remains parallel to the earth equatorial plane and the pitch axis remains aligned with the earth pole axis. For this attitude, the payload antennas do not require active steering to remain properly pointed at their ground targets. The foregoing standard attitude approach, however, may have a number of disadvantages. For example, the maximum solar array pointing error may result in a power loss up to 8.3%. Also, the transponder panel incident solar flux reduces the heat rejection capability by as much as 25%. These losses are typically compensated with commensurate increases in solar array and transponder panel area, which increase the spacecraft cost and mass.

One existing and commonly used strategy, known as the Sun-Nadir Pointing (SNP) strategy, can be used to address the limitations of the foregoing standard approach. Using SNP attitude steering, a time-varying yaw profile is implemented where the spacecraft may rotate almost ±180 degrees over an orbit. The yaw rotation keeps the sun vector oriented in the spacecraft yaw/roll plane; as a result, there is no sun exposure to the transponder panels. The solar arrays are controlled in such a way that they point directly at the sun at all times, thereby minimizing any cosine loss. SNP attitude steering also has its drawbacks. One such drawback is that it requires high spacecraft yaw rates when the angle between the sun vector and the orbit plane (denoted as the beta angle) becomes small. For example, when the beta angle is about ten (10) degrees, the maximum yaw rate is 0.024 deg/sec, and when the beta angle approaches zero (0) degrees, a near instantaneous one hundred and eighty (180) degree yaw flip is required at orbit noon and midnight. The high yaw rates result in the need for large reaction wheels with a corresponding mass penalty. Also, yaw pointing accuracy may be reduced due to the impact of gyro scale factor uncertainty. Because of these issues, standard SNP attitude steering is typically abandoned at low beta angles in favor of the standard attitude approach. However, even with a beta angle as low as ten (10) degrees, the standard attitude approach may still result in significant thermal radiator performance degradation (as much as 14%) and solar array power reduction (as much as 1.5%).

Hence, it would be desirable to provide methods and systems that are able to more efficiently effect attitude and antenna steering control, thereby increasing available solar array power and improving thermal radiator performance during attitude steering.

SUMMARY

The present invention provides an improved spacecraft attitude steering strategy or approach that maintains the sun vector in the yaw/roll plane at all times, even for low beta angles, and concurrently avoids the high angular rates and large rotation angles that are otherwise needed to implement a standard SNP strategy.

According to one aspect of the present invention, a system uses standard SNP attitude steering at high beta angles, but automatically switches to an alternative steering approach at low beta angles. The low beta angles may fall in the range roughly between about ten (10) to fifteen (15) degrees. The alternative steering approach rotates the spacecraft from the standard GEO attitude by the minimum angle necessary to orient the sun vector in the spacecraft yaw/roll plane. This strategy results in yaw and roll pointing offsets that vary at orbit rate in quadrature. For a beta angle of about ten (10) degrees, the alternative steering approach results in yaw and roll offsets of about ten (10) degrees and angular rates roughly below 0.0008 deg/sec., which are more than a factor of thirty (30) times smaller than the peak SNP yaw rate. As the beta angle reduces, the pointing offsets and angular rates diminish. When the beta angle reaches zero (0), the alternative steering approach reduces to the standard GEO attitude profile.

To maintain payload pointing using the alternative steering approach, the antenna coverage pattern is rotated or steered by an angle equal to the spacecraft body rotation angle. Such antenna coverage pattern steering can be achieved by using electrically steerable antennas, such as, phased array antennas. Using the standard SNP approach, the maximum antenna scan angle is equal to the earth angular radius. With the alternative steering approach, the antenna scan angle increases by an amount equal to the attitude offset. In one scenario, for a GEO spacecraft to maintain the total scan angle below about twenty-five (25) degrees, the alternative steering approach would be used when the beta angle is below about fifteen (15) degrees.

In one embodiment, a system for providing attitude and antenna steering for a spacecraft is provided. The spacecraft has a number of reaction wheels and a number of antennas. The system includes control logic configured to: determine a beta angle, the beta angle being the angle between a sun vector and an orbit plane of the spacecraft, and alternately engage either a first mode or a second mode to provide attitude and antenna steering based on the beta angle.

In another embodiment, a spacecraft is disclosed. The spacecraft has a number of sensors, a number of reaction wheels, a number of antennas, and a processor having flight control logic residing therein. The flight control logic is configured to: receive input information from the plurality of sensors, determine a beta angle, the beta angle being the angle between a sun vector and an orbit plane of the spacecraft, and alternately engage either a first mode or a second mode to provide attitude and antenna steering based on the beta angle and the input information.

In a further embodiment, a target frame generator for generating information usable to provide attitude and antenna steering for a spacecraft is disclosed. The spacecraft has a number of reaction wheels and a number of antennas. The target frame generator includes control logic configured to:

transform a sun vector in an inertial frame to an orbit frame associated with the spacecraft, compute an attitude quaternion representing a minimum rotation of the spacecraft from the orbit frame that places the sun vector in a yaw/roll plane of the spacecraft, wherein the attitude quaternion is usable to generate control signals to steer the antennas to maintain correct pointing at a coverage region, and compute an inertial-to-target frame transformation using the attitude quaternion, wherein the inertial-to-target frame transformation is usable to generate control signals to adjust the reaction wheels so as to rotate the spacecraft such that the sun vector is in the yaw/roll plane.

In one aspect, a method of providing attitude and antenna steering for a spacecraft having a number of reaction wheels and a number of antennas is disclosed. The method includes determining a beta angle, the beta angle being the angle between a sun vector and an orbit plane of the spacecraft, and engaging either a first mode or a second mode in an alternate manner to provide attitude and antenna steering based on the beta angle.

In another aspect, a method of providing attitude and antenna steering for a spacecraft having a number of reaction wheels and a number of antennas is disclosed. The method includes transforming a sun vector in an inertial frame to an orbit frame associated with the spacecraft, computing an attitude quaternion representing a minimum rotation of the spacecraft from the orbit frame that places the sun vector in a yaw/roll plane of the spacecraft, wherein the attitude quaternion is usable to generate control signals to steer the antennas to maintain correct pointing at a coverage region, and computing an inertial-to-target frame transformation using the attitude quaternion, wherein the inertial-to-target frame transformation is usable to generate control signals to adjust the reaction wheels so as to rotate the spacecraft such that the sun vector is in the yaw/roll plane.

The present invention may provide a number of advantages and/or benefits. For example, the present invention eliminates large rotation angles and high rates associated with the standard SNP approach, thereby improving attitude control performance. The present invention implements a yaw, roll and pitch attitude profile that results in minimal radiator or transponder sun exposure as well as minimal solar array sun pointing error. The present invention thus increases the available solar array power and improves thermal radiator performance, thereby allowing additional payload to be accommodated. Based on the disclosure and teachings provided herein, a person of ordinary skill in the art will realize other advantages and benefits provided by the present invention.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

Aspects, advantages and novel features of the present invention will become apparent from the following description of the invention presented in conjunction with the accompanying drawings.

DETAILED DESCRIPTION

Figure 1:
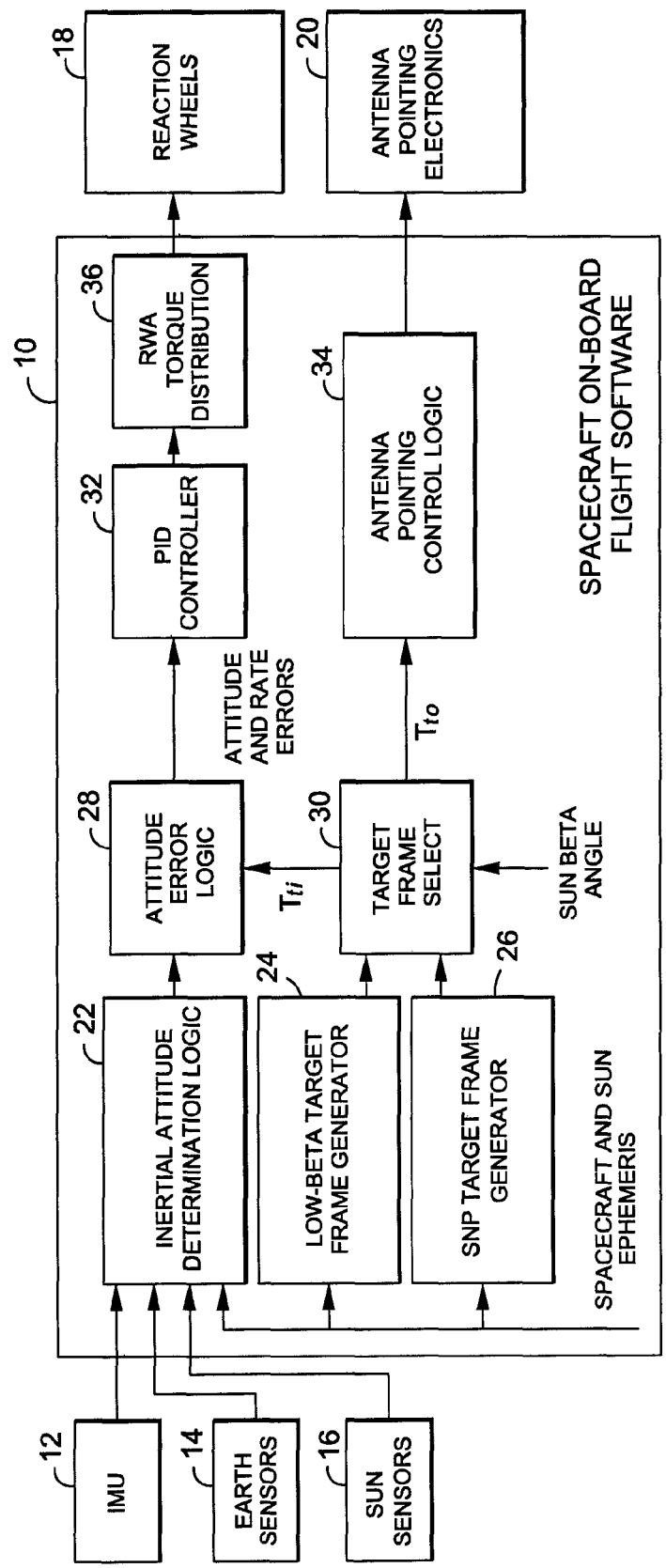
FIG. 1 is a simplified schematic block diagram illustrating one embodiment of the present invention.

The present invention in the form of one or more exemplary embodiments will now be described. FIG. 1 illustrates a system 10 according to one embodiment of the present invention. The system 10 receives attitude data from a number of attitude sensors. Such sensors include, for example, earth sensors 14, sun sensors 16, or star trackers, that are capable of providing three-axis attitude information. The system 10 also receives input information from an Inertial Measurement Unit (IMU) 12. The IMU 12 provides three-axis angular rate information that is propagated in time to maintain an accurate estimate of the inertial-to-body coordinate transformation. When attitude data is available, it is used to update the estimated attitude and gyro biases. It should be noted that earth sensor data may only be available when the roll angle is below roughly two (2) degrees. If star trackers are used, then attitude data may be available continuously. Using the attitude data provided by the attitude sensors and the input information from the IMU 12, the system 10 is able to generate control signals for adjusting the reaction wheels 18 and the antenna pointing electronics 20 including phased array antennas to effect appropriate attitude control and antenna pointing on a spacecraft, as will be further described below.

The system 10 has a number of components including two (2) target frame generators 24, 26, inertial attitude determination logic 22, attitude error logic 28, target frame selection logic 30, a Proportional-Integral-Derivative (PID) controller 32, RWA torque distribution logic 36 and antenna pointing control logic 34, each of which will be further described below.

The two (2) target frame generators include a SNP target frame generator 26 and a "low-beta" target frame generator 24. Both generators 24, 26 respectively determine inertial-to-target frame transformation that may be used for attitude steering and antenna pointing. Output from the SNP target frame generator 26 may be used to effect SNP steering and output from the low-beta target frame generator 24 may be used to effect low-beta steering. The target frame selection logic 30 selectively switches from SNP steering to low-beta steering depending on the sun beta angle $\beta$. The sun beta angle $\beta$ is defined as the angle between the sun vector and the orbit plane of a spacecraft. Typically, SNP steering would be used at high beta angles (e.g., above ten (10) to fifteen (15) degrees), where the antenna pointing correction needed for low-beta steering may be beyond the antenna scan angle capability. The low-beta steering would be used at beta angles where the antenna scan angle range is sufficient to maintain accurate antenna pattern pointing. In other words, where the antenna coverage pattern is capable of rotating by an angle equal to the spacecraft body rotation angle. Depending on the scan capabilities of the antenna located on the spacecraft, it may be possible to eliminate the SNP target frame generator 26 and rely solely on the low-beta frame target generator 24 to effect appropriate attitude steering and antenna pointing.

The low-beta target frame generator 24 functions as follows. First, the sun unit vector $S_i$ in the inertial frame is transformed to the nominal spacecraft pointing frame $S_0$ as $$S_0 = T_{oi} S_i \qquad \text{Eq. (1)}$$

where $T_{oi}$ is a 3×3 transformation matrix. The nominal spacecraft pointing frame $S_0$ may be the orbit frame, or may be some other frame in which the proper payload antenna coverage is achieved without steering corrections. The rotation from the orbit frame to the low-beta steering target frame is defined by the attitude quaternion $q_{to}$:

$$q_{to} = \begin{bmatrix} e_1 \sin(\theta/2) \\ e_2 \sin(\theta/2) \\ e_3 \sin(\theta/2) \\ \cos(\theta/2) \end{bmatrix} \quad \text{Eq. (2)}$$

where $e=[e_1,e_2,e_3]^T$ is the rotation axis unit vector and $\theta$ is the rotation angle given by $$e = \frac{S_0 \times V}{\|S_0 \times V\|} \quad \text{Eq. (3)}$$

$$\theta = \frac{\pi}{2} - \sin^{-1}(\|S_0 \times V\|)$$

The 3×1 unit vector V is the orbit frame axis normally aligned with the spacecraft positive pitch axis $[001]^T$. The quaternion $q_{to}$ given by Eq. (2) represents the minimum rotation of the spacecraft from the orbit frame that places the sun vector in the yaw/roll plane. The quaternion $q_{to}$ of Eq. (2) may be converted to a direction cosine matrix $T_{to}$ (also referred to as the orbit-to-target frame transformation) and used to compute the inertial-to-target frame transformation matrix $T_{ti}$:

$$T_{ti} = T_{to} T_{oi} \quad \text{Eq. (4)}$$

When the target frame selection logic 30 selects low-beta steering, this transformation matrix $T_{ti}$ is input to the attitude error logic 28. The attitude error logic 30 uses this matrix $T_{ti}$ in combination with the inertial-to-body transformation provided by the inertial attitude determination logic 22 to generate attitude and rate errors. These errors are then input to the HD controller 32. The PID controller 32 computes torque demands. The torque demands are then forwarded to the RWA torque distribution logic 36 which distributes the torque demands to the corresponding reaction wheels 18. The reaction wheels 18, in turn, apply control torque to the spacecraft. The control torque causes the spacecraft to remain aligned with the target frame and causes the sun vector to remain perpendicular to the spacecraft solar array rotation axis. With the spacecraft tracking this attitude, there is nominally no sun exposure to the spacecraft radiator panels which are parallel to the spacecraft yaw/roll plane. Hence, the radiator size does not have to increase in order to reject absorbed solar radiation. Also, the solar array, which rotates at the GEO orbit rate, remains nominally sun-pointed at all times.

To maintain correct pointing of the antenna pattern at the ground coverage region, the orbit-to-target frame transformation $T_{to}$ is input to the antenna pointing control logic 34. The antenna pointing control logic 34 computes control signals used to modulate the phased array antenna element phases such that the pointing of each vector in the coverage pattern remains unchanged in the spacecraft orbit frame.

Figure 2:
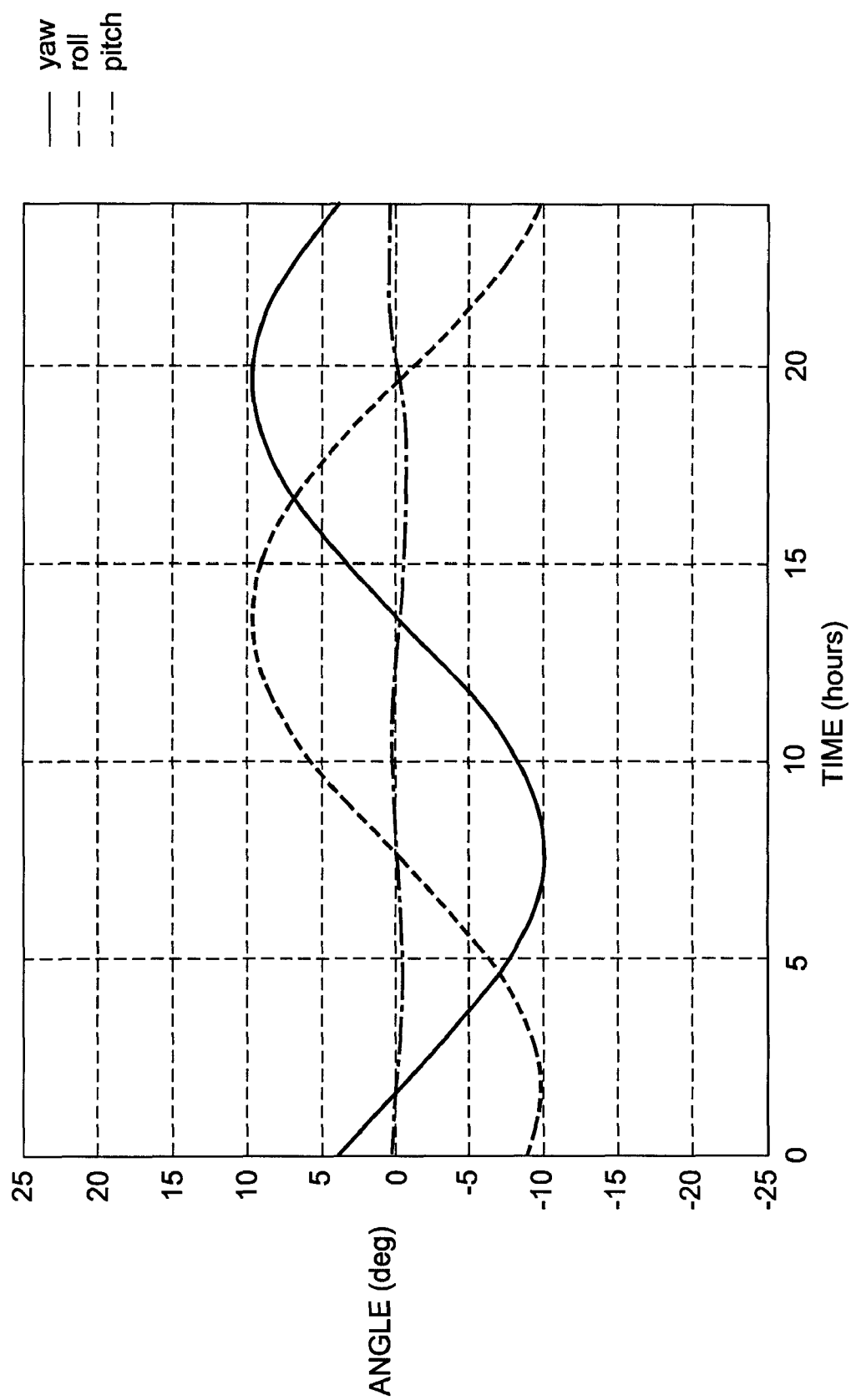
FIG. 2 is a diagram illustrating yaw, roll and pitch offsets according to the present invention.

FIG. 2 shows yaw, roll and pitch pointing offsets from the orbit frame for a beta angle of about ten (10) degrees using a low-beta steering approach according to the present invention. The yaw and roll angles vary at orbit rate, ninety (90) degrees out of phase, with maximum amplitude equal to the beta angle. The pitch angle varies at twice orbit rate and is given by the expression $\theta_p=0.5(1-\cos\beta)$. For a beta angle of about ten (10) degrees, the peak pitch angle is roughly 0.43 degrees.

To compensate for the variation in attitude, the antenna pattern pointing is varied continuously. Because the effects of pitch and yaw are small compared to the roll angle, the required peak angular change is roughly equal to the roll angle. The necessary scan angle range for a vector in the antenna coverage pattern is therefore approximately the earth angular radius (8.7 deg) in geosynchronous orbit plus the beta angle. As is known to those skilled in the art, it is a simple matter to determine the required scan range for a given coverage pattern and a steering profile. Once the required scan range is known, based on the disclosure and teachings provided herein, it is possible to select an upper bound beta angle for low-beta steering based on the capabilities of the antenna system.

Figure 3:
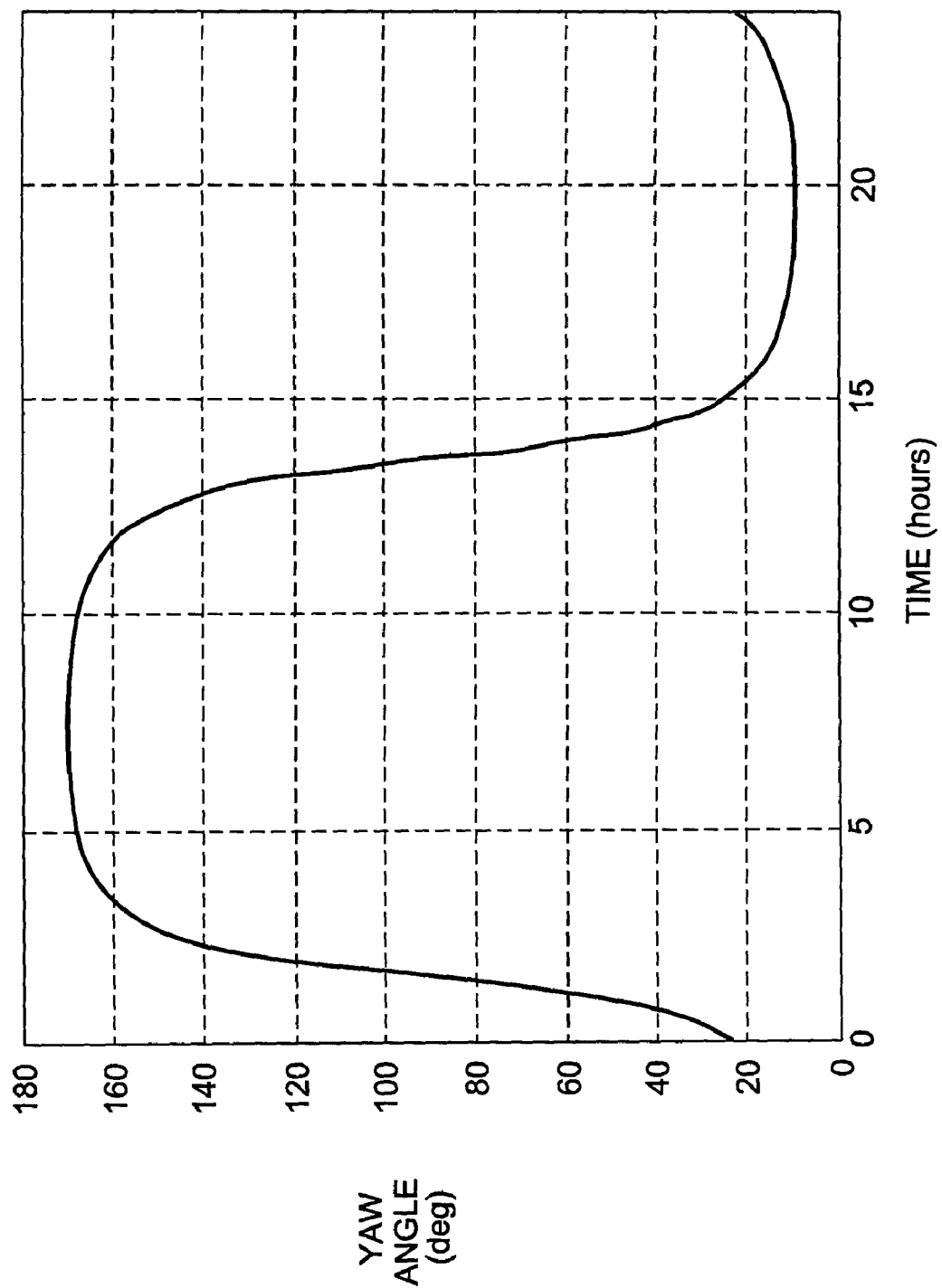
FIG. 3 is a diagram illustrating a yaw profile for SNP steering with a beta angle of about ten (10) degrees.

For comparison, FIG. 3 shows the yaw attitude profile for SNP steering for a beta angle of about ten (10) degrees. As can be seen, the spacecraft must execute a yaw rotation of one hundred and sixty (160) degrees twice during each orbit. The rotation angle is considerably larger than that required to implement low-beta steering at the same beta angle.

Figure 4:
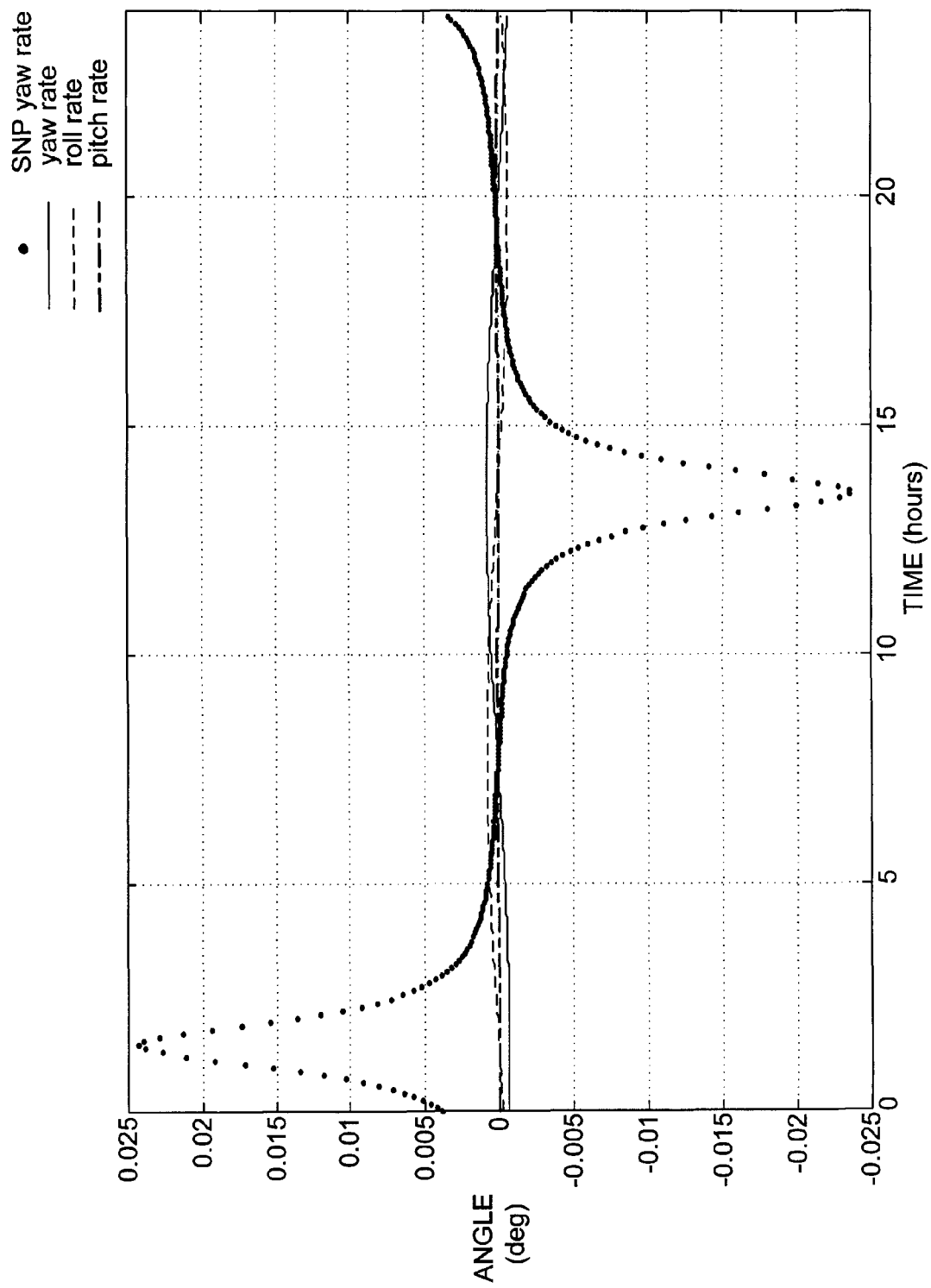
FIG. 4 is a diagram illustrating comparison of SNP yaw rate and steering rates according to the present invention.

FIG. 4 provides a comparison of the spacecraft yaw rate using SNP steering and angular rates using low-beta steering according to the present invention. The peak yaw rate of 0.024 deg/sec is more than thirty (30) times larger than the angular rates required for an attitude steering profile according to the present invention. For a large spacecraft, the high rates required for SNP steering at low beta angles may necessitate the need for large reaction wheels with a corresponding mass penalty.

Based on the disclosure and teachings provided herein, it should be understood that the present invention can be used in a variety of applications including, for example, commercial and/or government spacecraft programs including satellites and other space-based vehicles. A person of ordinary skill in the art will appreciate other ways and/or methods to deploy the present invention in different types of applications.

It should be understood that the present invention as described above can be implemented in software, hardware, or a combination of both, in the form of control logic in a modular or integrated manner, residing on computer-readable media or otherwise that are executable by a processor or other types of computing devices. For example, the present invention can be implemented as part of the spacecraft on-board flight software. Based on the disclosure and teachings provided herein, a person of ordinary skill in the art will appreciate other ways and/or methods to implement the present invention.

The above description is illustrative but not restrictive. Many variations of the present invention will become apparent to those skilled in the art upon review of the disclosure. The scope of the present invention should, therefore, be determined not with reference to the above description, but instead should be determined with reference to the pending claims along with their full scope or equivalents.

What is claimed is:

1. A method of providing attitude and antenna steering for a spacecraft having a plurality of reaction wheels and a plurality of antennas, the method comprising:
   determining a beta angle, the beta angle being the angle between a sun vector and an orbit plane of the spacecraft; and
   engaging either a first mode or a second mode in an alternate manner to provide attitude and antenna steering based on the beta angle,
   wherein the plurality of antennas includes a plurality of phased array antennas, and wherein the antenna steering based on the beta angle includes modulating the plurality of phased array antennas based on the beta angle.

2. The method of claim 1 wherein engaging either the first mode or the second mode further comprises engaging either the first mode or the second mode based on whether the beta angle is below a threshold value.

3. The method of claim 2 wherein the threshold value is about 10-15 degrees.

4. The method of claim 2 wherein the first mode is engaged when the beta angle is above the threshold value, the first mode utilizing the Sun Nadir Pointing strategy; and
wherein the second mode is engaged when the beta angle is below the threshold value.

5. The method of claim 1 further comprising:
adjusting the plurality of reaction wheels to rotate the spacecraft such that the sun vector is in a yaw or roll plane of the spacecraft at all times when the second mode is engaged.

6. The method of claim 1 wherein the plurality of antennas are configured to provide an antenna coverage pattern; and
the method further comprising:
rotating the antenna coverage pattern by an angle equal to a body rotation angle of the spacecraft when the second mode is engaged.

7. The method of claim 1 wherein the plurality of antennas are configured to provide an antenna coverage pattern; and
the method further comprising:
engaging the second mode for all values of the beta angle if the plurality of antennas are sufficient to maintain the antenna coverage pattern.

8. The method of claim 1 wherein the spacecraft further includes a plurality of radiator panels that are parallel to a yaw or roll plane of the spacecraft; and
the method further comprising:
adjusting the plurality of reaction wheels to rotate the spacecraft such that there is nominally no sun exposure to the plurality of radiator panels when the second mode is engaged.

9. Flight control software implementing the method as recited in claim 1, the flight control software residing on a computer-readable medium executable by a processor onboard the spacecraft.

* * * * *